US012579893B2

(12) United States Patent
Hamaguchi

(10) Patent No.: US 12,579,893 B2
(45) Date of Patent: Mar. 17, 2026

(54) PARKING ROUTE GENERATION DEVICE

(71) Applicant: Hino Motors, Ltd., Tokyo (JP)

(72) Inventor: Yutaka Hamaguchi, Hino (JP)

(73) Assignee: Hino Motors, Ltd., Tokyo (JP)

( * ) Notice: Subject to any disclaimer, the term of this patent is extended or adjusted under 35 U.S.C. 154(b) by 72 days.

(21) Appl. No.: 18/690,766

(22) PCT Filed: Sep. 7, 2022

(86) PCT No.: PCT/JP2022/033614
§ 371 (c)(1),
(2) Date: Mar. 11, 2024

(87) PCT Pub. No.: WO2023/042731
PCT Pub. Date: Mar. 23, 2023

(65) Prior Publication Data
US 2024/0404411 A1      Dec. 5, 2024

(30) Foreign Application Priority Data

Sep. 17, 2021    (JP) ................................ 2021-152125

(51) Int. Cl.
*G08G 1/16*          (2006.01)
*B60W 30/06*        (2006.01)
(Continued)

(52) U.S. Cl.
CPC ............. *G08G 1/168* (2013.01); *B60W 30/06* (2013.01); *B60W 60/0011* (2020.02);
(Continued)

(58) Field of Classification Search
None
See application file for complete search history.

(56) References Cited

U.S. PATENT DOCUMENTS

2016/0129939 A1    5/2016  Singh et al.
2020/0180691 A1    6/2020  Sandblom et al.
(Continued)

FOREIGN PATENT DOCUMENTS

JP          2018-199458 A      12/2018

OTHER PUBLICATIONS

International Search Report issued Oct. 11, 2022 in PCT/JP2022/033614, 2 pages.
(Continued)

*Primary Examiner* — Arslan Azhar
(74) *Attorney, Agent, or Firm* — Oblon, McClelland, Maier & Neustadt, L.L.P.

(57)          ABSTRACT

A parking route generation device includes a pattern storage unit that stores a plurality of backward route patterns, a position setting unit that sets a parking start position of a coupled vehicle and a target parking position of the coupled vehicle, a trajectory generation unit that generates a plurality of backward route profiles on the basis of information indicating the wheelbase length of the trailer in the coupled vehicle and information stored in a pattern storage unit, a trajectory selection unit that selects the backward trajectory profile in which the coupled vehicle does not collide with an obstacle, a route determination unit that determines a parking route so that the coupled vehicle that has started parking from the parking start position is parked at the target parking position through backward movement after forward movement, and a route output unit that outputs the parking route.

6 Claims, 13 Drawing Sheets

(51) Int. Cl.
    *B60W 60/00*     (2020.01)
    *B62D 15/02*     (2006.01)
    *G01C 21/36*     (2006.01)
    *G05D 1/43*     (2024.01)

(52) U.S. Cl.
    CPC ..... *B62D 15/0285* (2013.01); *G01C 21/3614*
        (2013.01); *G05D 1/43* (2024.01); *B60W*
        *2720/10* (2013.01)

(56)         References Cited

U.S. PATENT DOCUMENTS

| | | | |
|---|---|---|---|
| 2020/0247471 A1 | 8/2020 | Grodde | |
| 2020/0393825 A1* | 12/2020 | Golgiri ............. | B62D 15/0285 |
| 2022/0161853 A1* | 5/2022 | Ramirez Llanos ........................ | |
| | | | B62D 15/0285 |

OTHER PUBLICATIONS

International Preliminary Report on Patentability and Written Opinion issued Mar. 28, 2024 in PCT/JP2022/033614, 5 pages.
Extended European Search Report issued Jul. 25, 2025 in European Patent Application No. 22869878.3, 6 pages.

\* cited by examiner (a)
TRAJECTORY PROFILE WHEN TRAILER WHEELBASE HAS LENGTH OF 6 m OR LESS (b)
TRAJECTORY PROFILE WHEN TRAILER WHEELBASE HAS LENGTH OF 8 m OR LESS (c)
TRAJECTORY PROFILE WHEN TRAILER WHEELBASE HAS LENGTH OF 10 m OR LESS (a)                                                    (b)

(c)

PARKING ROUTE GENERATION DEVICE

TECHNICAL FIELD

One aspect of the present invention relates to a parking route generation device.

BACKGROUND ART

For example, Patent Literature 1 describes a backward parking assistance device that assists with backward parking of a coupled vehicle including a tractor and a trailer. The backward parking assistance device described in Patent Literature 1 creates a parking target route from a host vehicle position to a target parking position, and sets a steering angle of the coupled vehicle so that the coupled vehicle moves along the parking target route. In this case, for the parking target route, a traveling trajectory of the coupled vehicle when follow-up control is performed using a Pure Pursuit method is created.

CITATION LIST

Patent Literature

[Patent Literature 1] Japanese Unexamined Patent Publication No. 2018-199458

SUMMARY OF INVENTION

Technical Problem

Here, in a parking route for the coupled vehicle, movement is particularly complex at the time of backward movement. Therefore, there is a problem in that it is difficult to generate a backward route with high precision when the parking route for the coupled vehicle is generated, and a calculation cost increases due to an attempt to generate the backward route with as high precision as possible.

One aspect of the present invention has been made in view of these circumstances, and an object of the present invention is to generate a parking route for a coupled vehicle with high accuracy and at a low calculation cost.

Solution to Problem

A parking route generation device according to an aspect of the present invention is a parking route generation device for generating a parking route for causing a coupled vehicle including a tractor and a trailer to park, the parking route generation device including: a pattern storage unit configured to store a plurality of backward route patterns with a rear axle of the trailer as a reference for each wheelbase type of the trailer, the plurality of backward route patterns being a plurality of backward route patterns having different degrees of change in curvature in the route; a position setting unit configured to set a parking start position of the coupled vehicle and a target parking position of the coupled vehicle on the basis of information including a current position of the coupled vehicle; a trajectory generation unit configured to specify the plurality of backward route patterns corresponding to a wheelbase type of the trailer in the coupled vehicle on the basis of information indicating the wheelbase type of the trailer in the coupled vehicle and information stored in the pattern storage unit, and generate a plurality of backward route profiles on the basis of the plurality of specified backward route patterns; a trajectory selection unit configured to select the backward trajectory profile in which the coupled vehicle does not collide with an obstacle on the basis of the target parking position, information on the obstacle near the coupled vehicle, and the plurality of backward trajectory profiles; a route determination unit configured to determine a parking route so that the coupled vehicle that has started parking from the parking start position is parked at the target parking position through backward movement after forward movement, on the basis of the parking start position, the target parking position, and the backward trajectory profile selected by the trajectory selection unit; and a route output unit configured to output the parking route determined by the route determination unit.

In the parking route generation device according to the aspect of the present embodiment, the plurality of backward route patterns with a rear axle of the trailer as a reference are stored for each wheelbase type of the trailer in advance. When the parking route is generated, the plurality of backward trajectory profiles corresponding to the wheelbase type of the trailer in the coupled vehicle are specified, and the plurality of backward trajectory profiles are generated on the basis of the plurality of specified backward trajectory profiles. The backward trajectory profile in which the coupled vehicle does not collide with a nearby obstacle is selected from among the plurality of backward trajectory profiles generated in this way, and the parking route is determined on the basis of the selected backward trajectory profile, the parking start position, and the target parking position. In the parking route for the coupled vehicle, movement is particularly complex at the time of backward movement. Therefore, there is a problem in that it is difficult to generate the backward route with high precision in generation of the parking route for the coupled vehicle, and a calculation cost increases in order to generate the backward route with as high precision as possible. In this regard, in the parking route generation device according to the aspect of the present embodiment, since the plurality of backward route patterns are stored for each wheelbase type of the trailer in advance, and the backward route profile is selected from among such information stored in advance, it is possible to greatly reduce the calculation cost. Further, since the plurality of backward route patterns are stored for each wheelbase length of the trailer, it is possible to generate the backward route with high precision (with high reproducibility) depending on the type of trailer to be coupled to the tractor. As described above, with the parking route generation device according to the aspect of the present embodiment, it is possible to generate the parking route for the coupled vehicle with high accuracy and at a low calculation cost.

The route determination unit may determine a backward movement start position at which the coupled vehicle starts the backward movement, on the basis of the target parking position and the backward trajectory profile selected by the trajectory selection unit, determine, as the backward route, a route to reach the target parking position along the selected backward trajectory profile from the backward movement start position, determine a forward route in which the coupled vehicle that has started forward movement from the parking start position reaches the backward movement start position without collision with the obstacle, on the basis of the parking start position, the backward movement start position, and the information on the obstacle, after determining the backward route, and determine the parking route on the basis of the forward route and the backward route. For example, when the forward route is determined first and then the backward route is determined in an order of actual traveling routes, there may be restrictions regarding the forward route in determining the backward route, and for example, a vehicle posture may be bent at a point in time when the target parking position is reached. Such a problem occurs more noticeably in the coupled vehicle having a coupling angle. In this respect, since the backward route is determined first and then the forward route is determined (the route determination is made in reverse order from the target parking position), there are no restrictions regarding the forward route when the backward route is determined, making it possible to generate an ideal parking route by curbing bending of the vehicle posture at the time of parking.

When there are a plurality of backward trajectory profiles in which the coupled vehicle does not collide with the obstacle, the route determination unit may determine the parking route on the basis of one backward trajectory profile having a lowest degree of change in curvature in the route among the plurality of backward trajectory profiles in which the coupled vehicle does not collide with the obstacle. Accordingly, since a route in which the number of steering wheel operations is as small as possible is selected for the backward route, it is possible to curb a driver's discomfort at the time of backward movement.

Advantageous Effects of Invention

According to an aspect of the present invention, it is possible to generate the parking route for the coupled vehicle with high accuracy and at a low calculation cost.

DESCRIPTION OF EMBODIMENTS

Hereinafter, embodiments of the present invention will be described in detail with reference to the drawings. In the respective figures, the same or corresponding parts are denoted by the same reference signs, and redundant description will be omitted.

Figure 1:
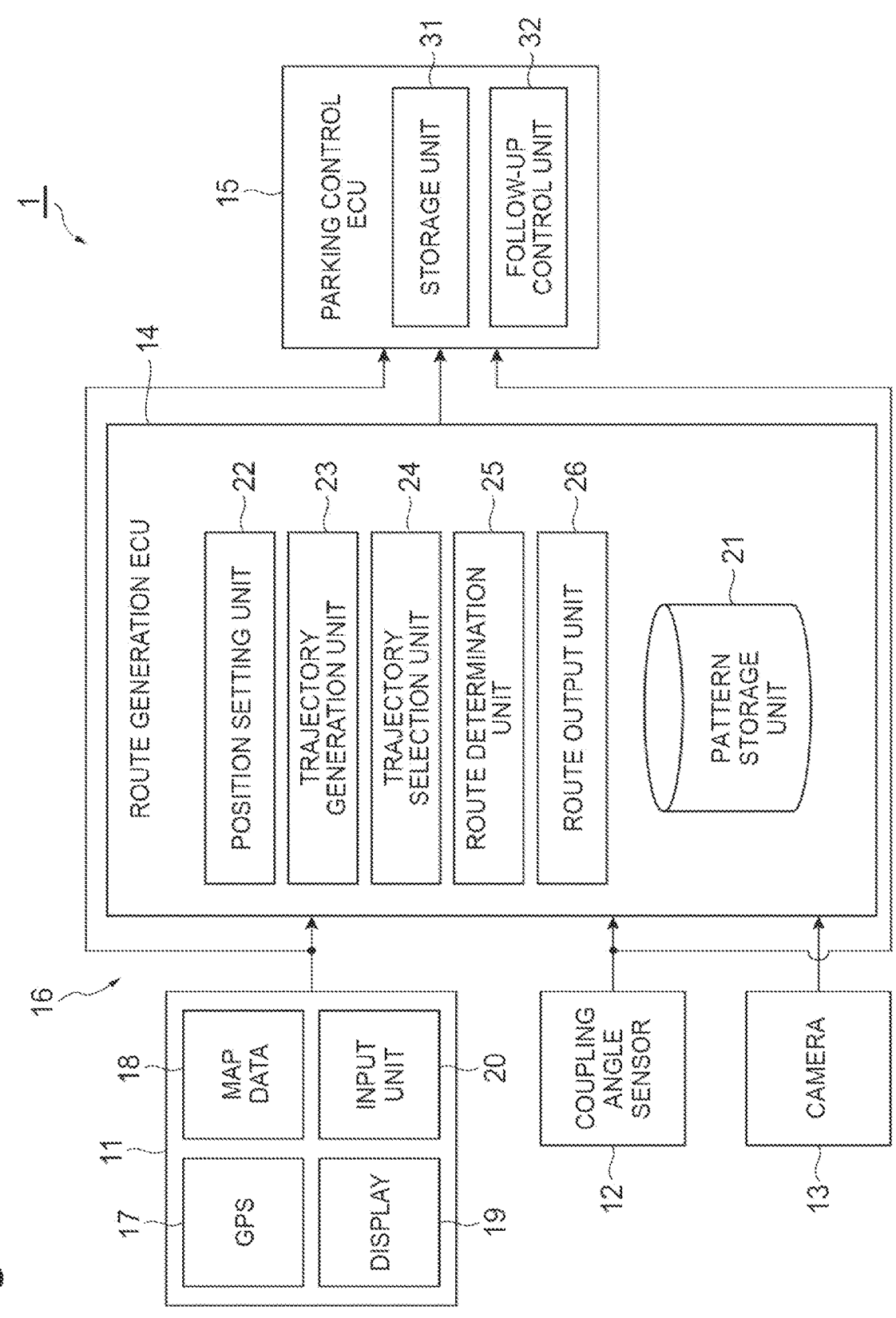
FIG. 1 is a block diagram schematically illustrating a parking control device including a parking route generation device according to an embodiment of the present invention.
Figure 2:
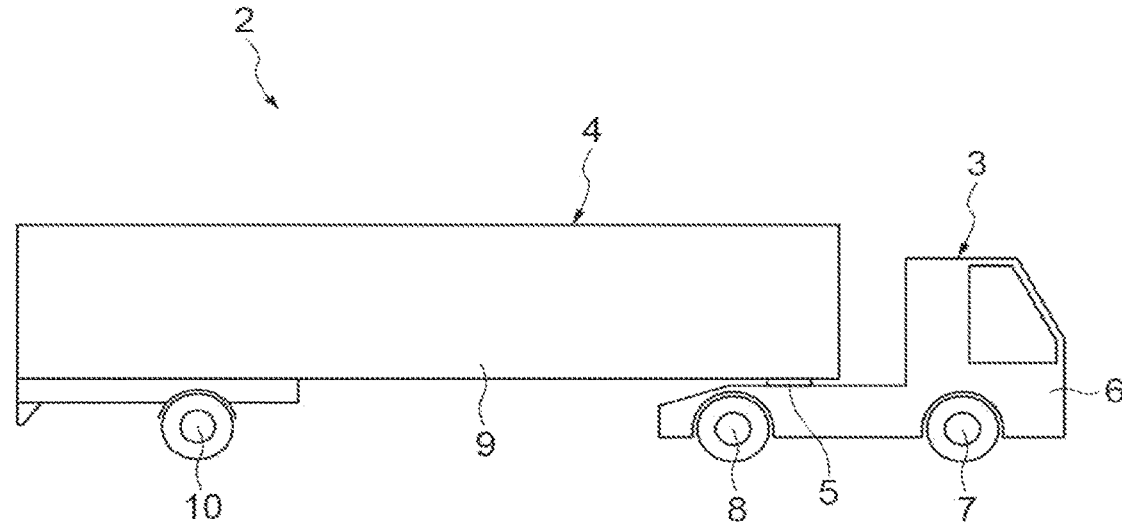
FIG. 2 is a side view of a coupled vehicle having the parking control device illustrated in FIG. 1 mounted thereon.
Figure 3:
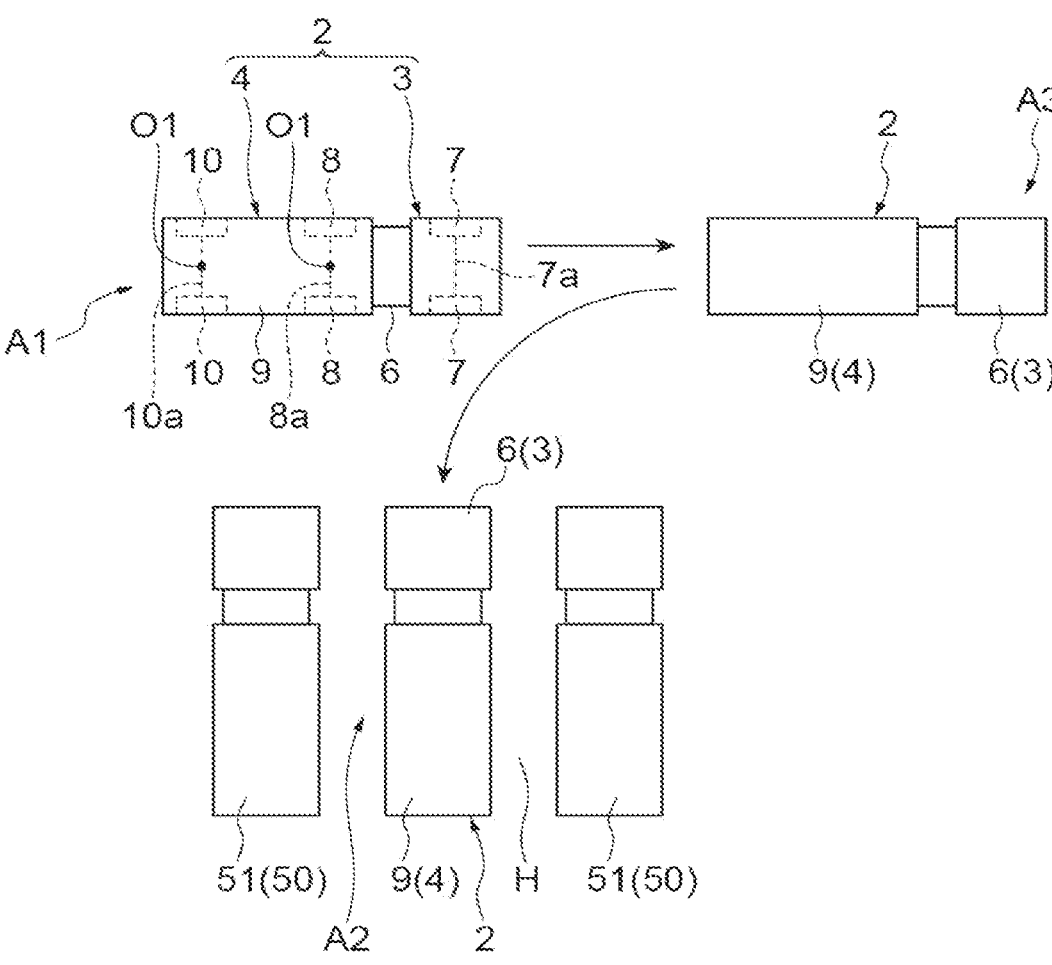
FIG. 3 is a plan view illustrating a state in which the coupled vehicle illustrated in FIG. 2 is parking.

FIG. 1 is a block diagram schematically illustrating a parking control device including a parking route generation device according to an embodiment of the present invention. In FIG. 1, the parking control device 1 according to the present embodiment is a device that automatically causes a coupled vehicle 2 to park in a parking lot or the like, as illustrated in FIGS. 2 and 3.

Here, the coupled vehicle 2 is a large semi-trailer truck. The coupled vehicle 2 may be a medium-sized truck or a small-sized truck. The coupled vehicle 2 includes a tractor 3 and a trailer 4 disposed on the rear side of the tractor 3. The trailer 4 is rotatably coupled to the tractor 3 at a coupling portion 5.

The tractor 3 includes a vehicle body 6, a pair of left and right front wheels 7 rotatably supported on the front side of the vehicle body 6, and a pair of left and right rear wheels 8 rotatably supported on the rear side of the vehicle body 6. The tractor 3 has an engine (not illustrated) mounted thereon. The trailer 4 includes a vehicle body 9 and a pair of left and right wheels 10 rotatably supported on the rear side of the vehicle body 9.

Referring back to FIG. 1, the parking control device 1 is mounted on the tractor 3 of the coupled vehicle 2. The parking control device 1 includes a car navigation 11, a coupling angle sensor 12, a camera 13, a route generation ECU 14, and a parking control ECU 15.

The car navigation 11, the coupling angle sensor 12, the camera 13, and the route generation ECU 14 constitute a parking route generation device 16 of the present embodiment. The parking route generation device 16 is a device that generates a parking route for causing the parking control device 1 to park the coupled vehicle 2.

As illustrated in FIG. 3, the parking route generation device 16 generates a parking route in which the coupled vehicle 2 moves forward from the side of a parking space H, turns around once, and then moves backward into the parking space H. Specifically, the parking route generation device 16 generates a parking route in which the coupled vehicle 2 moves forward from a parking start position A1 to a turnaround position A3 (backward movement start position) and then moves backward from the turnaround position A3 to the target parking position A2. The parking start position A1, the target parking position A2, and the turnaround position A3 will be described in detail below.

The car navigation 11 includes a GPS receiver 17 that receives radio waves transmitted from GPS satellites and measures the current position of the coupled vehicle 2, a map storage unit 18 that stores map data, a display 19 that displays the current position of the coupled vehicle 2 together with the map, and an input unit 20 that sets and inputs data such as a destination of the coupled vehicle 2.

The GPS receiver 17 constitutes a position detection unit that detects the current position of the coupled vehicle 2. The GPS receiver 17 detects position coordinates and an azimuth angle of two-dimensional coordinates (X and Y coordinates) of the tractor 3 as the current position of the coupled vehicle 2.

The coupling angle sensor 12 is a sensor that detects a coupling angle between the tractor 3 and the trailer 4. The coupling angle is an angle at which an imaginary line extending in a front-rear direction of the tractor 3 intersects with an imaginary line extending in a front-rear direction of the trailer 4. The coupling angle is 0 degrees in a state in which the tractor 3 and the trailer 4 are disposed on the same straight line.

The camera 13 is an imaging unit that images surroundings of the coupled vehicle 2. The camera 13 is provided, for example, in each of the tractor 3 and the trailer 4. The camera 13 constitutes an environment detection unit that detects a surrounding environment of the coupled vehicle 2, such as the presence or absence of an obstacle 50 (FIG. 3).

Examples of the obstacle 50 may include another parked vehicle 51 (see FIG. 3 or the like), a wall 52 of a building (see FIG. 7 or the like), and a curb. When the wall 52 of the building is known from map data stored in the car navigation 11, the map storage unit 18 of the car navigation 11 also constitutes the environment detection unit described above.

The route generation ECU 14 includes a CPU, a RAM, a ROM, an input and output interface, and the like. The route generation ECU 14 receives information of the car navigation 11, a detection value of the coupling angle sensor 12, and a captured image of the camera 13, executes processing regarding generation of a parking route for the coupled vehicle 2, and outputs data including the parking route for the coupled vehicle 2 to the parking control ECU 15.

The route generation ECU 14 includes a pattern storage unit 21, a position setting unit 22, a trajectory generation unit 23, a trajectory selection unit 24, a route determination unit 25, and a route output unit 26.

The pattern storage unit 21 stores the plurality of backward route patterns with a rear axle of the trailer 4 as a reference for each wheelbase length (wheelbase type) of the trailer 4. The pattern storage unit 21 groups, for example, a plurality of types of trailers 4 that can be coupled to the tractor 3 for a predetermined range of wheelbase lengths, and stores the plurality of backward route patterns for each group. Specifically, the pattern storage unit 21 divides the trailers 4, for example, into a group of trailers 4 having a wheelbase length of 6 m or less, a group of trailers 4 having a wheelbase length of more than 6 m and 8 m or less, and a group of trailers 4 having a wheelbase length of more than 8 m and 10 m or less, and stores the plurality of backward route patterns for each group.

Figure 4:
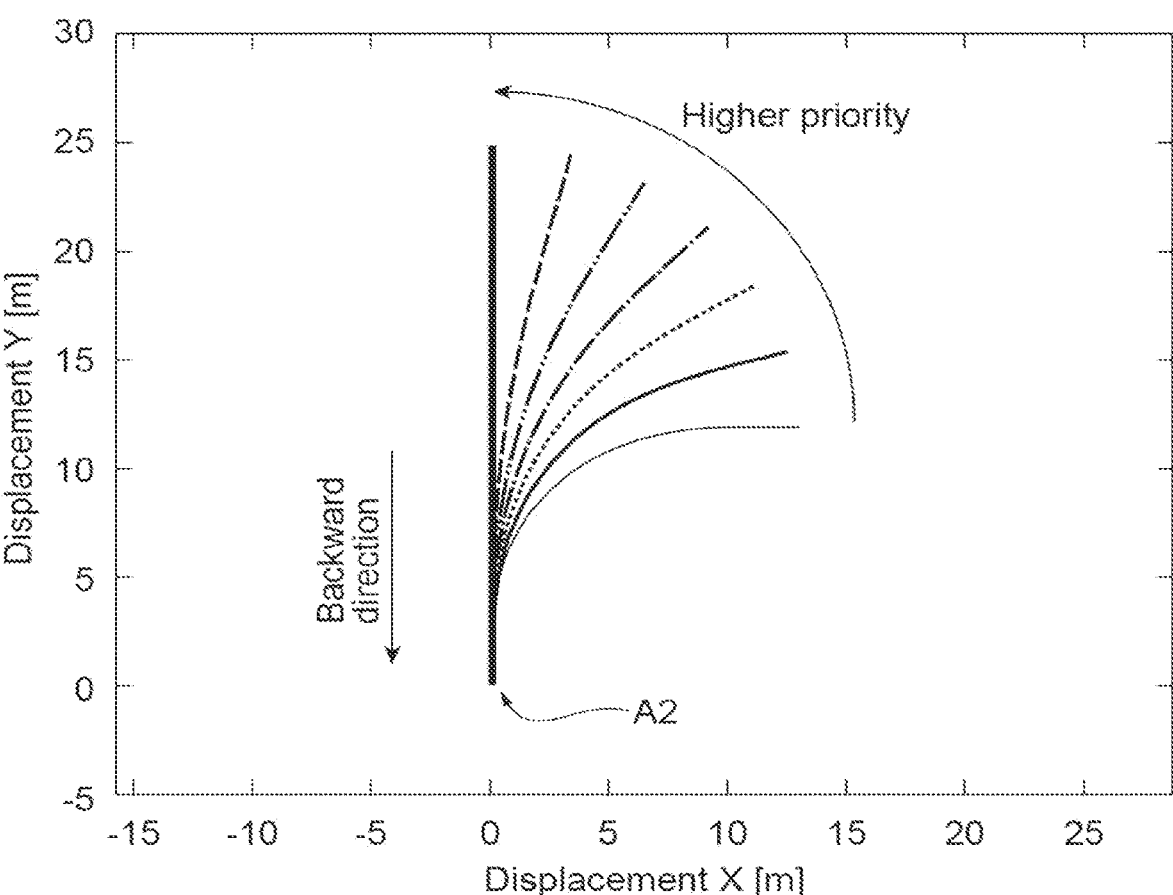
FIG. 4 is a diagram illustrating a backward route pattern.

Each of the plurality of backward route patterns is a trajectory that the rear axle of the trailer 4 having the corresponding wheelbase length can actually take at the time of backward movement. The trajectory of the backward route pattern is represented by a curved line whose curvature changes continuously. The backward route pattern is a backward trajectory profile at a rear axle center of the trailer 4 when the coupled vehicle 2 turns in a most space-saving manner. The plurality of backward route patterns belonging to the group having the same wheelbase length have different degrees of change in curvature in the route. The plurality of backward route patterns illustrated in FIG. 4 indicate the plurality of backward route patterns belonging to the group having the same wheelbase length, and seven backward route patterns having different degrees of change in curvature in the route are indicated as backward route patterns toward a common target parking position A2. In the example illustrated in FIG. 4, the backward route pattern is illustrated in 15° increments in a range of 0° to 90° with the target parking position A2 as a reference. As illustrated in FIG. 4, when a degree of change in curvature of the plurality of backward route patterns is lower, the backward route pattern is more likely to be selected in trajectory selection that will be described below, that is, the priority may be higher.

Figure 5:
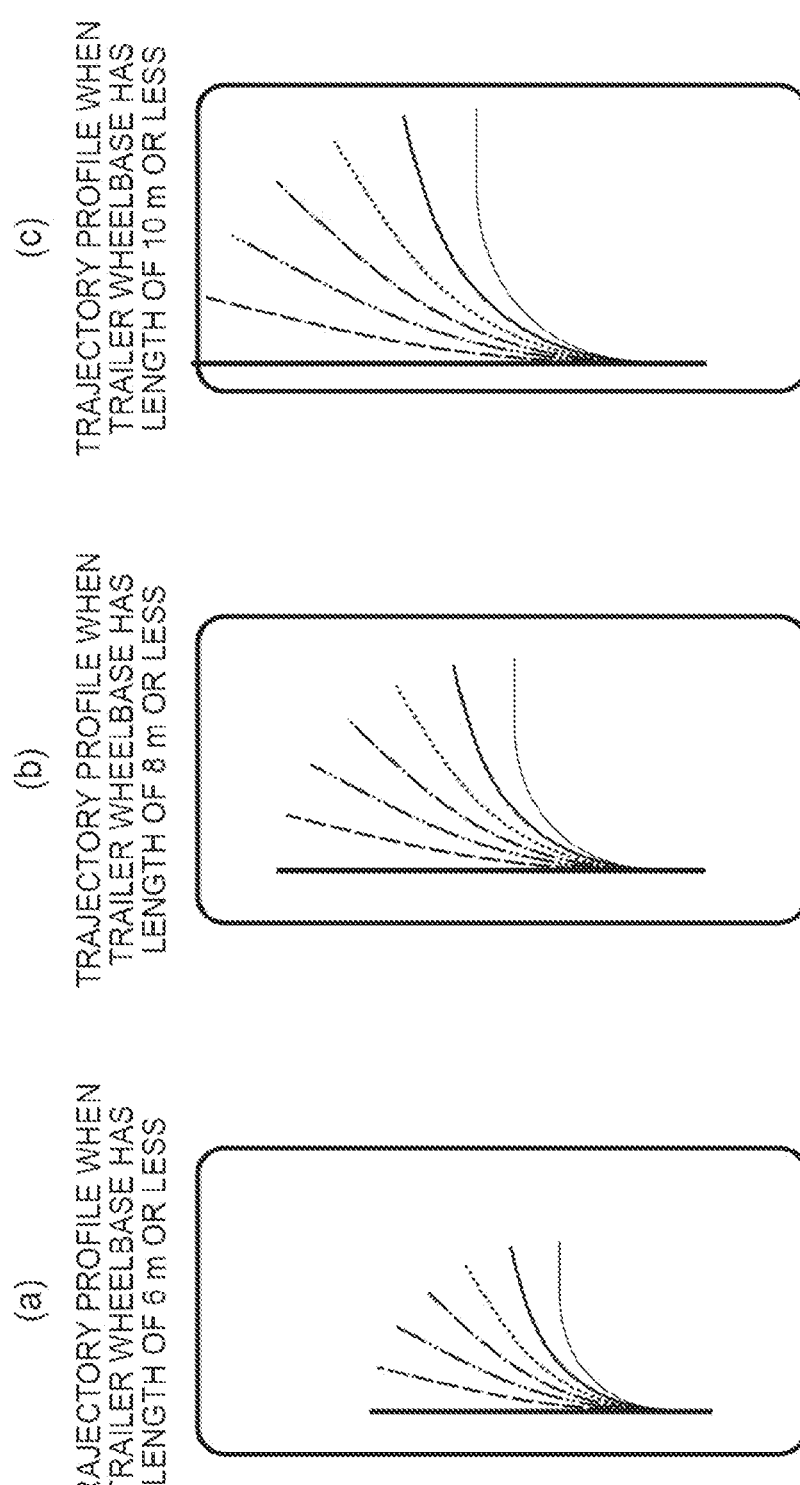
FIG. 5 is a diagram illustrating a backward route pattern for each trailer wheelbase length.

As illustrated in FIG. 5, in a group of trailers 4 having a wheelbase length of 6 m or less (see FIG. 5(*a*)), a group of trailers 4 having a wheelbase length of greater than 6 m and 8 m or less (see FIG. 5(*b*)), and a group of trailers 4 having a wheelbase length of greater than 8 m and 10 m or less (see FIG. 5(*c*)), a plurality of different backward route patterns (trajectory profiles) are different. In the parking route generation device 16 according to the present embodiment, it is possible to generate the backward route with high precision (high reproducibility) since the backward route is generated on the basis of a backward route pattern close to an actual wheelbase length of the trailer 4.

A tri-clothoid, for example, is used for design of the backward route pattern. However, since the backward route pattern is generated by off-line calculation, the backward route pattern may be generated by using a scheme with a higher load than the tri-clothoid.

The position setting unit 22 sets the parking start position A1 of the coupled vehicle 2 and the target parking position A2 of the coupled vehicle 2 on the basis of information including the current position of the coupled vehicle 2. The position setting unit 22 uses the current position of the coupled vehicle 2 detected by the GPS receiver 17 of the car navigation 11 to set the parking start position A1 (see FIG. 3) of the coupled vehicle 2. Specifically, the position setting unit 22 sets the parking start position A1 of the coupled vehicle 2 on the basis of the current position of the coupled vehicle 2 and the coupling angle θ between the tractor 3 and the trailer 4 detected by the coupling angle sensor 12. The position setting unit 22 acquires, for example, position coordinates, an azimuth angle, and a turning curvature of the trailer 4 as the parking start position A1 of the coupled vehicle 2.

The position setting unit 22 sets the target parking position A2 (see FIG. 3) of the coupled vehicle 2 using the information of the car navigation 11 including the current position of the coupled vehicle 2 detected by the GPS receiver 17. Specifically, the position setting unit 22 sets the target parking position A2 of the coupled vehicle 2 on the basis of information of the car navigation 11 including the current position of the coupled vehicle 2, the coupling angle θ between the tractor 3 and the trailer 4 detected by the coupling angle sensor 12, and the captured image of the camera 13. The target parking position A2 may be input as coordinate information from the outside of the present system according to an external instruction (an HMI operation by the driver, an instruction from a traffic control, or the like), autonomous parking space detection in an upper processing layer of an automatic driving system, or the like.

The position setting unit 22 acquires, for example, the position coordinates, azimuth angle, and turning curvature of the trailer 4 as the target parking position A2 of the coupled vehicle 2. Details of the processing of the position setting unit 22 will be described below.

The trajectory generation unit 23 generates the plurality of backward trajectory profiles. The trajectory generation unit 23 specifies the plurality of backward route patterns corresponding to the wheelbase length of the trailer 4 in the coupled vehicle 2 on the basis of information indicating the wheelbase length of the trailer 4 in the coupled vehicle 2, and information stored in the pattern storage unit 21 (the plurality of backward route patterns for each wheelbase length of the trailer 4). That is, the trajectory generation unit 23 specifies the plurality of backward route patterns corresponding to the wheelbase length of the trailer 4 that is a target for which backward trajectory profiles are to be generated. Information such as the wheelbase length of the trailer 4 may be acquired, for example, by causing the trailer 4 to include an ID tag and reading the ID tag, or may also be estimated by image processing by the wheels being imaged by a camera mounted on the tractor 3 side. For example, in the example illustrated in FIG. 5, when the wheelbase length of the trailer 4 is 7 m, the plurality of backward route patterns illustrated in FIG. 5(*b*) are specified (extracted). The trajectory generation unit 23 generates the plurality of backward trajectory profiles on the basis of the plurality of specified backward route patterns. Specifically, the trajectory generation unit 23 generates the backward trajectory profile (tractor backward trajectories) indicating a backward trajectory of the tractor 3 from the plurality of backward trajectory profiles with the rear axle of the trailer 4 as a reference. Details of processing of the trajectory generation unit 23 will be described below.

The trajectory selection unit 24 selects a backward trajectory profile in which the coupled vehicle 2 does not collide with an obstacle, on the basis of the target parking position A2, information on the obstacle 50 around the coupled vehicle 2, and the plurality of backward trajectory profiles (tractor backward trajectories) generated by the trajectory generation unit 23. The information on the obstacle 50 around the coupled vehicle 2 is acquired from the camera 13 that can function as the environment detection unit and the map storage unit 18 of the car navigation 11. The trajectory selection unit 24 selects one or more backward trajectory profiles in which the trajectory does not overlap the obstacle 50 (that is, the vehicle body 9 of the trailer 4 or the vehicle body 6 of the tractor 3 does not collide with the objects 50) from among the plurality of backward trajectory profiles (tractor backward trajectories) leading to the target parking position A2. Details of the processing of the trajectory selection unit 24 will be described below.

The route determination unit 25 determines the parking route so that the coupled vehicle 2 that has started parking from the parking start position A1 is parked at the target parking position A2 through backward movement after forward movement, on the basis of the target parking position A2 and the backward trajectory profile selected by the trajectory selection unit 24.

The route determination unit 25 first determines the turnaround position A3 (backward movement start position) at which the coupled vehicle 2 starts backward movement, on the basis of the target parking position A2 and the backward trajectory profile selected by the trajectory selection unit 24. The route determination unit 25 determines, as the backward route, a route from the turnaround position A3 to the target parking position A2 along the selected backward trajectory profile.

After the route determination unit 25 determines the above-described backward route, the route determination unit 25 determines the forward route in which the coupled vehicle 2 that has started forward movement from the parking start position A1 reaches the turnaround position A3 without collision with the obstacle 50, on the basis of the parking start position A1, the turnaround position A3, and the information on the obstacle 50. The route determination unit 25 determines the parking route by collating the forward route with the backward route.

When there are the plurality of backward trajectory profiles selected by the trajectory selection unit 24, the route determination unit 25 determines the turnaround position A3 for each of the backward trajectory profiles, and determines the backward route and the forward route. When there are the plurality of backward trajectory profiles selected by the trajectory selection unit 24, the route determination unit 25 may determine the backward route of the parking route on the basis of one backward trajectory profile having a lowest degree of change in curvature in the route among the plurality of backward trajectory profiles.

The route determination unit 25 uses a geometric model of the coupled vehicle 2 to perform a vehicle motion simulation in which the coupled vehicle 2 performs follow-up control through forward traveling from the parking start position A1 and the target parking position A2 to the turnaround position A3, to thereby calculate a data series of the steering angle of the tractor 3 and a data series of each posture angle of the tractor 3 and the trailer 4. The data series is history data.

The route output unit 26 outputs data of the parking route (parking route data) determined by the route determination unit 25 to the parking control ECU 15. Further, the route output unit 26 outputs the data series of the steering angle of the tractor 3 and the data series of each posture angle of the tractor 3 and the trailer 4 to the parking control ECU 15.

The parking control ECU 15 includes a CPU, a RAM, a ROM, an input and output interface, and the like. The parking control ECU 15 receives the parking route data and data series from the route generation ECU 14, the information from the car navigation 11, and the detection value from the coupling angle sensor 12, and executes processing regarding automatic parking of the coupled vehicle 2.

The parking control ECU 15 includes a storage unit 31 and a follow-up control unit 32. The storage unit 31 stores the parking route data and the data series output from the route output unit 26 of the route generation ECU 14.

The follow-up control unit 32 performs steering control and speed control of the coupled vehicle 2 to park the coupled vehicle 2 at the target parking position A2 according to the parking route data and data series stored in the storage unit 31. The follow-up control unit 32 controls the steering of the coupled vehicle 2 in the steering control of the coupled vehicle 2, and controls an accelerator and a brake in the speed control of the coupled vehicle 2.

In this case, the follow-up control unit 32 performs feedforward control of steering of the tractor 3 to park the coupled vehicle 2 at the target parking position A2, according to the data series of the steering angle of the tractor 3 and the data series of each of posture angles of the tractor 3 and the trailer 4. That is, the follow-up control unit 32 performs feedforward control of the steering of the tractor 3 with the data series of the steering angle of the tractor 3 and the data series of each posture angle of the tractor 3 and the trailer 4 as target values. Further, the follow-up control unit 32 performs feedback control of the steering of the tractor 3 so that the coupled vehicle 2 is parked at the target parking position A2, on the basis of the coupling angle θ between the tractor 3 and the trailer 4 detected by the coupling angle sensor 12 and the current position of the coupled vehicle 2 detected by the GPS receiver 17.

The follow-up control unit 32 performs, for example, follow-up control for virtually considering a vehicle in a target posture on a target route of the trailer 4 given by a tri-clothoid curve and making a relative error of an actual vehicle with respect to the target value close to 0 as a state quantity. An example of the follow-up control for making an error state quantity close to 0 may include LQ control.

Figure 6:
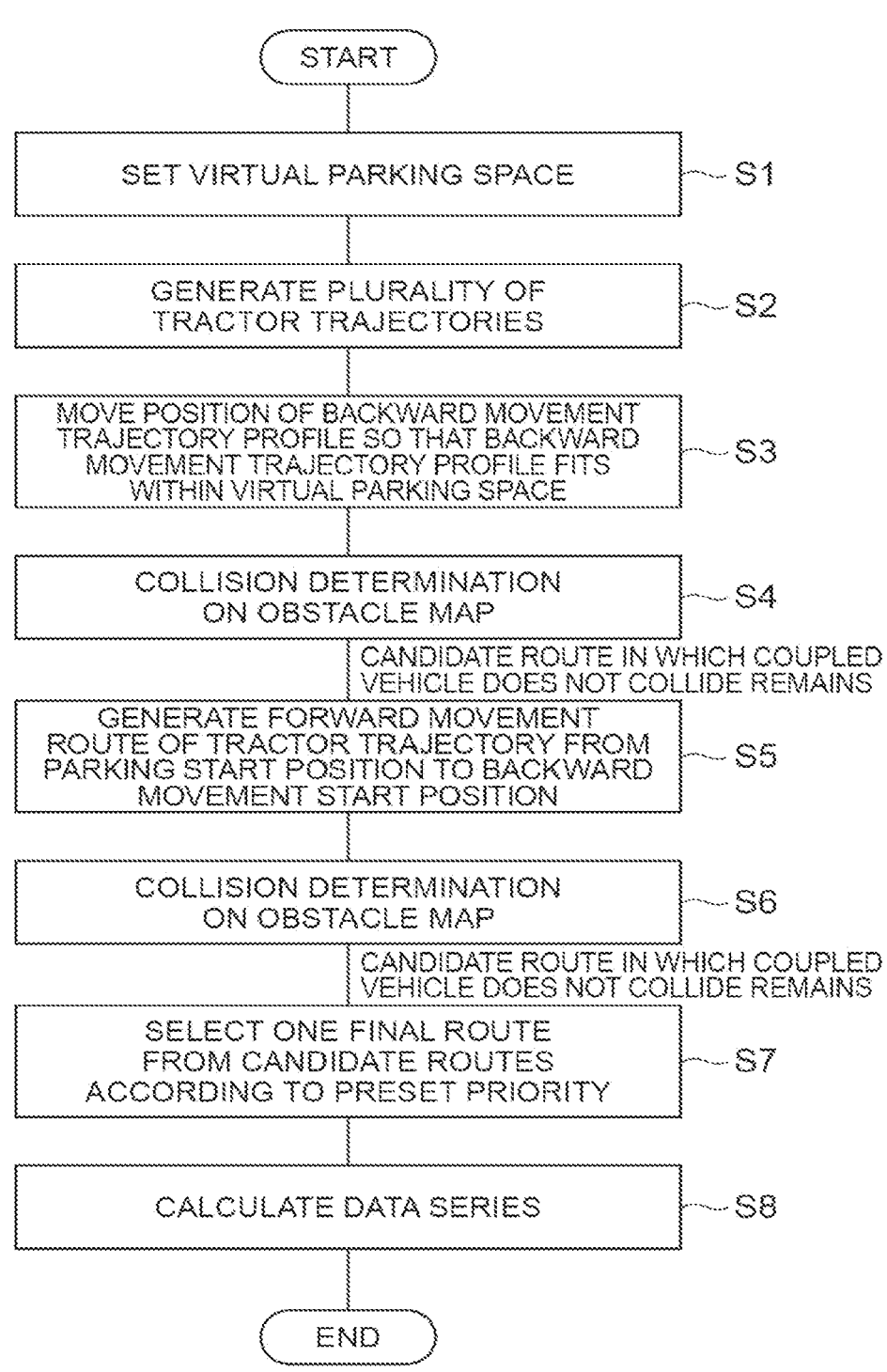
FIG. 6 is a flowchart illustrating details of a procedure of a route generation process executed by a route generation ECU illustrated in FIG. 1.

Next, the procedure of a route generation process will be described in detail with reference to FIG. 6. FIG. 6 is a flowchart illustrating details of the procedure of the route generation process executed by the route generation ECU 14. This process is executed when a driver of the coupled vehicle 2 instructs to start parking assistance. In this case, the driver may set and input a target parking position candidate for the coupled vehicle 2 using the input unit 20 of the car navigation 11.

As illustrated in FIG. 6, the route generation ECU 14 sets a virtual parking space at the target parking position A2 (step S1). As a premise of this process, the route generation ECU 14 first acquires the position coordinates, azimuth angle, and turning curvature of the trailer 4 as the parking start position A1 of the coupled vehicle 2 on the basis of the information of the car navigation 11 including the GPS receiver 17 and the detection value of the coupling angle sensor 12. The position coordinates of the trailer 4 are, for example, position coordinates of the rear axle center of the trailer 4. As illustrated in FIG. 3, the rear axle center of the trailer 4 is a center in an axial direction (a vehicle width direction of the trailer 4) of a vehicle axle 10a coupled to the pair of left and right wheels 10 disposed on the rear side of the trailer 4. The azimuth angle of the trailer 4 corresponds to a yaw angle of the trailer 4. The azimuth angle of the tractor 3 corresponds to a yaw angle of the tractor 3. Further, the turning curvature of the trailer 4 uniquely corresponds to the coupling angle of the trailer 4 with respect to the tractor 3 on condition that steady turning of the coupled vehicle 2 is assumed. Therefore, the coupling angle θ between the tractor 3 and the trailer 4 is obtained by using an algebraic formula with the turning curvature of the trailer 4 as an input. Therefore, the turning curvature of the trailer 4 is obtained from the coupling angle θ between the tractor 3 and the trailer 4. In a state in which the coupling angle θ between the tractor 3 and the trailer 4 is 0 degrees, the turning curvature of the trailer 4 is 0. Further, the route generation ECU 14 sets the position coordinates, azimuth angle, and turning curvature of the trailer 4 as the target parking position A2 of the coupled vehicle 2 on the basis of the information of the car navigation 11 including the GPS receiver 17, the detection value of the coupling angle sensor 12, and the captured image of the camera 13.

Figure 7:
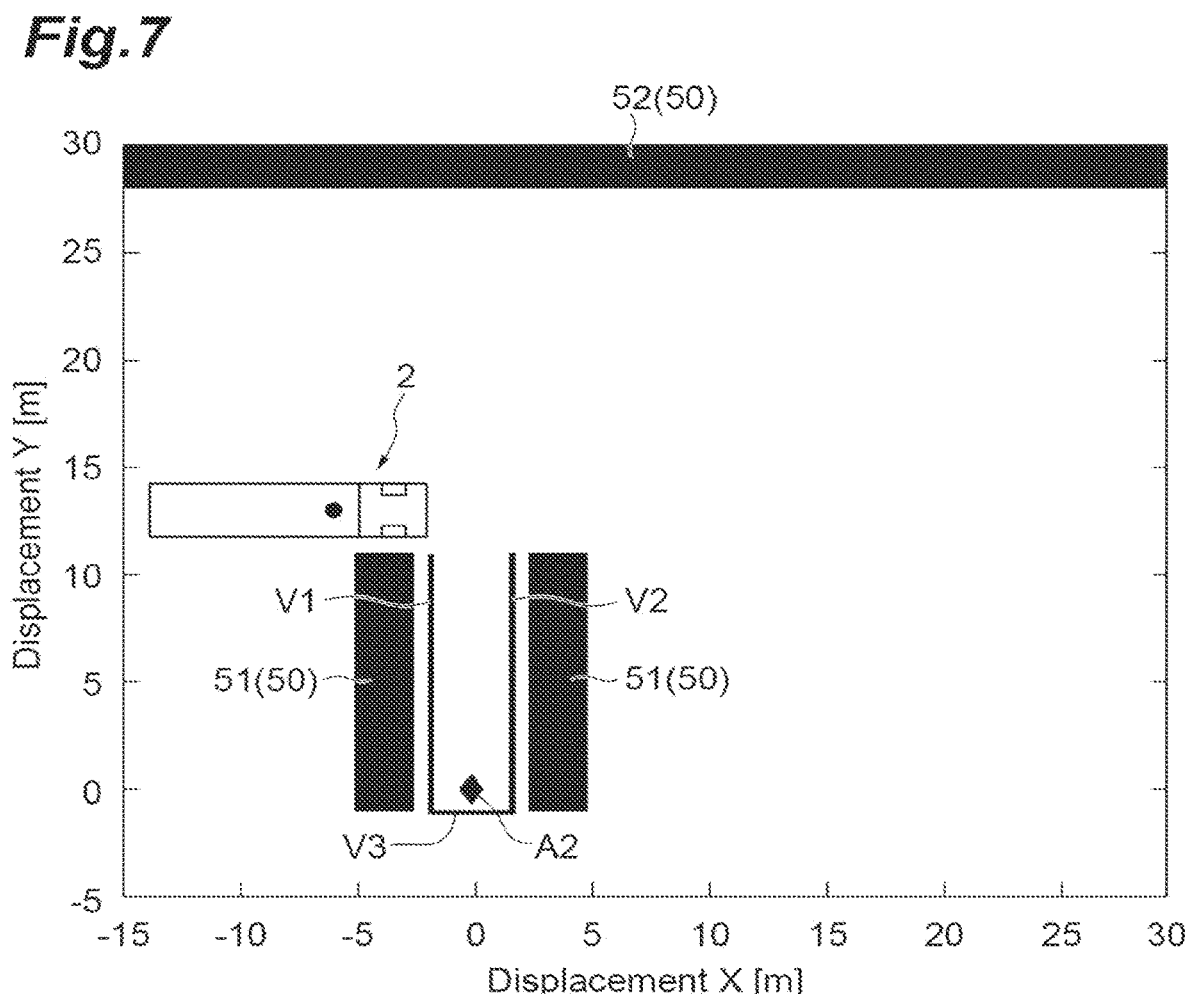
FIG. 7 is a diagram illustrating a setting of a virtual parking space.

As illustrated in FIG. 7, the route generation ECU 14 sets virtual walls V1 to V3 constituting a virtual parking space that surrounds three sides of the target parking position A2. In the example illustrated in FIG. 7, the virtual walls V1 and V2 are virtual walls that surround side surfaces of the coupled vehicle 2, and the virtual wall V3 is a virtual wall that surrounds a rear part of the coupled vehicle 2. The route generation ECU 14 sets a backward route to be described below so that the coupled vehicle 2 does not come into contact the virtual walls V1 to V3.

Figure 8:
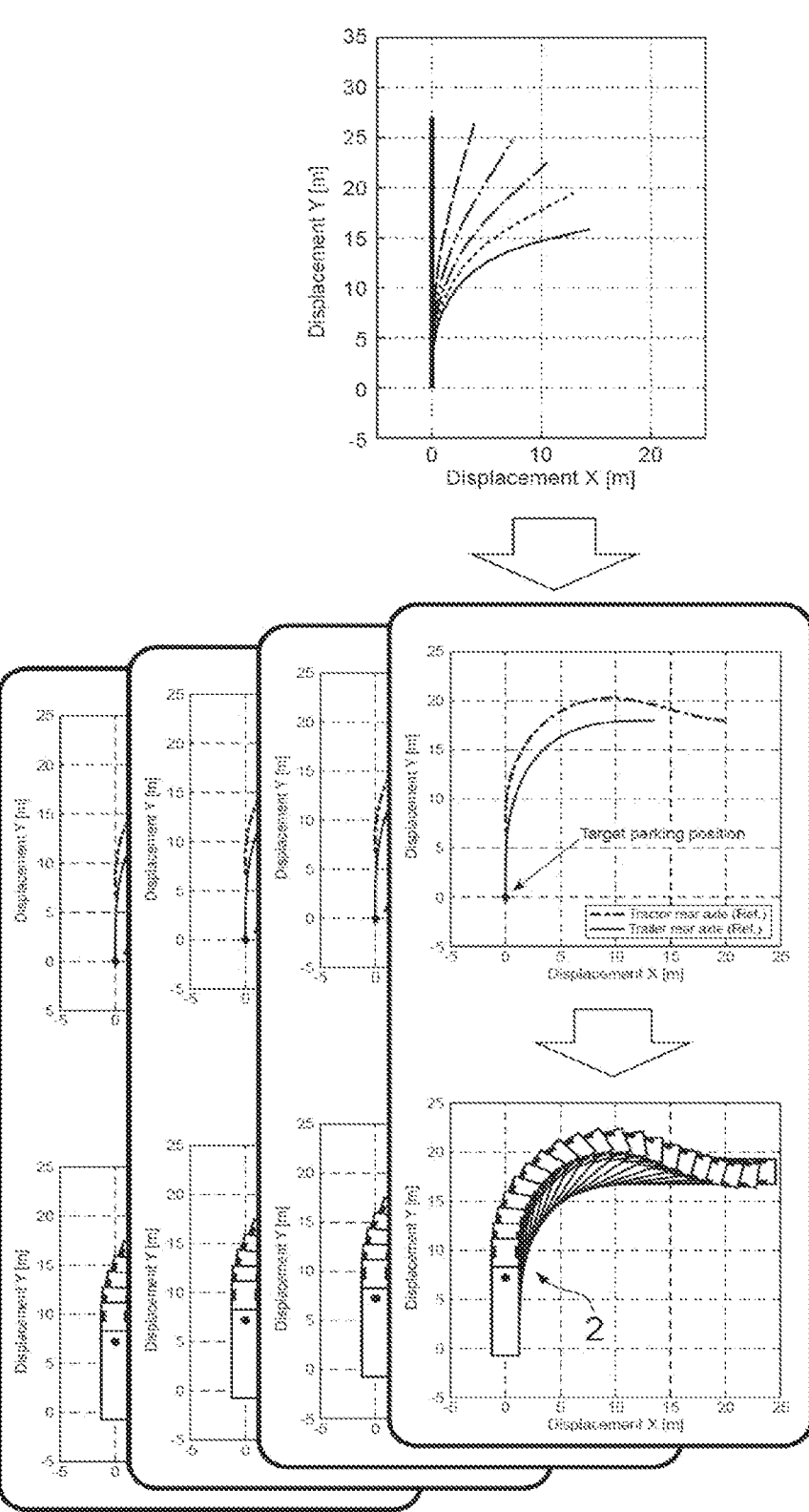
FIG. 8 is a diagram illustrating generation of a tractor backward trajectory.

Subsequently, the route generation ECU 14 generates the plurality of backward trajectory profiles (tractor backward trajectories) indicating the backward trajectories of the tractor 3 (step S2). The route generation ECU 14 first specifies the plurality of backward route patterns corresponding to the wheelbase length of the trailer 4 in the coupled vehicle 2 on the basis of the information indicating the wheelbase length of the trailer 4 in the coupled vehicle 2 and the information stored in the pattern storage unit 21 (the plurality of backward route patterns for each wheelbase length of the trailer 4). That is, the route generation ECU 14 specifies the plurality of backward route patterns corresponding to the wheelbase length of the trailer 4 that is a target for which backward trajectory profiles are to be generated (see an upper diagram in FIG. 8). Such a backward route pattern is generated by using a tri-clothoid curve as a curve on which a curvature changes continuously from an initial position to a target position.

The tri-clothoid curve is a curve in which sudden change in curvature do not occur. The tri-clothoid curve is a smooth curve whose initial and end curves and positions can be arbitrarily designated through a combination of three clothoid curves with the same route lengths. The tri-clothoid curve can be simply obtained by numerically solving a 2-variable nonlinear equation. The tri-clothoid curve is described in detail in "Route generation scheme capable of designating initial and end curvatures using a clothoid curve" in the Transactions of the Japan Society of Mechanical Engineers (Vol. 85, No. 878, 2019).

The route generation ECU 14 generates the plurality of backward trajectory profiles on the basis of the plurality of specified backward route patterns. Specifically, the route generation ECU 14 generates the backward trajectory profile (tractor backward trajectories) indicating the backward trajectories of the tractor 3 from the plurality of backward trajectory profiles with the rear axle of the trailer 4 as a reference. In an upper diagram in a lower part of FIG. 8, a trajectory of the rear axle of the trailer 4 is indicated by a solid line, and a trajectory of a rear axle of the tractor 3 is indicated by a broken line. The route generation ECU 14 derives the trajectory of the rear axle of the tractor 3 indicated by the broken line, on the basis of, for example, the trajectory of the rear axle of the trailer 4 indicated by the solid line and dimensions of the vehicle body 9 of the trailer 4. The route generation ECU 14 derives the trajectory of the entire coupled vehicle 2 on the basis of the trajectory of the rear axle of the trailer 4 and the trajectory of the rear axle of the tractor 3, as illustrated in a lower diagram in a lower part of FIG. 8. The route generation ECU 14 generates the backward trajectory profile for each of the plurality of backward route patterns, as illustrated in a lower part of FIG. 8.

Figure 9:
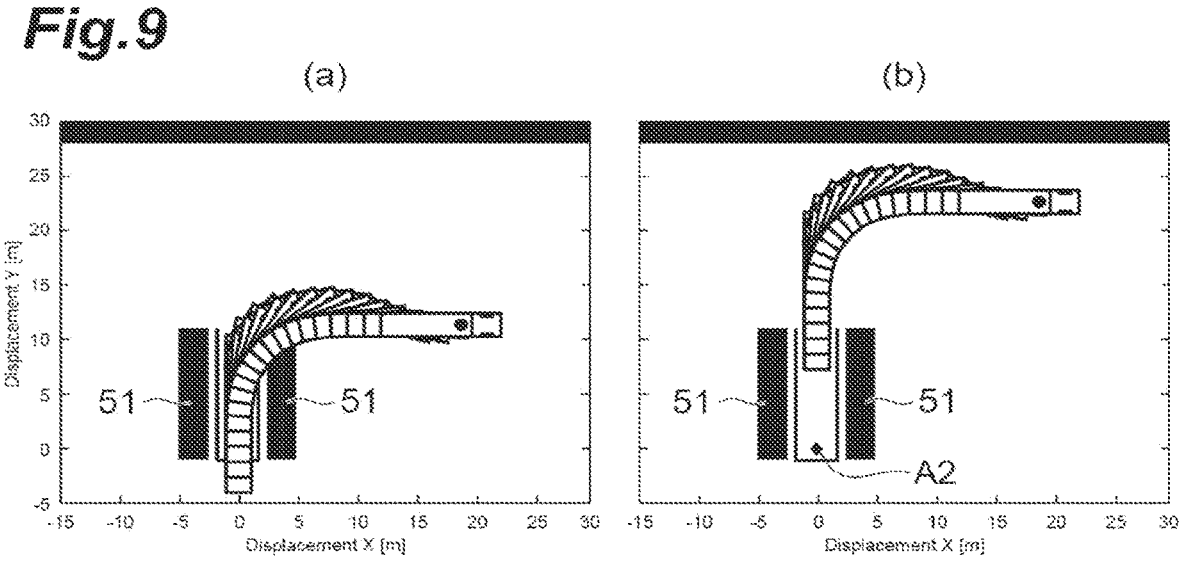
FIG. 9 is a diagram illustrating movement of a backward trajectory profile.
Figure 9:
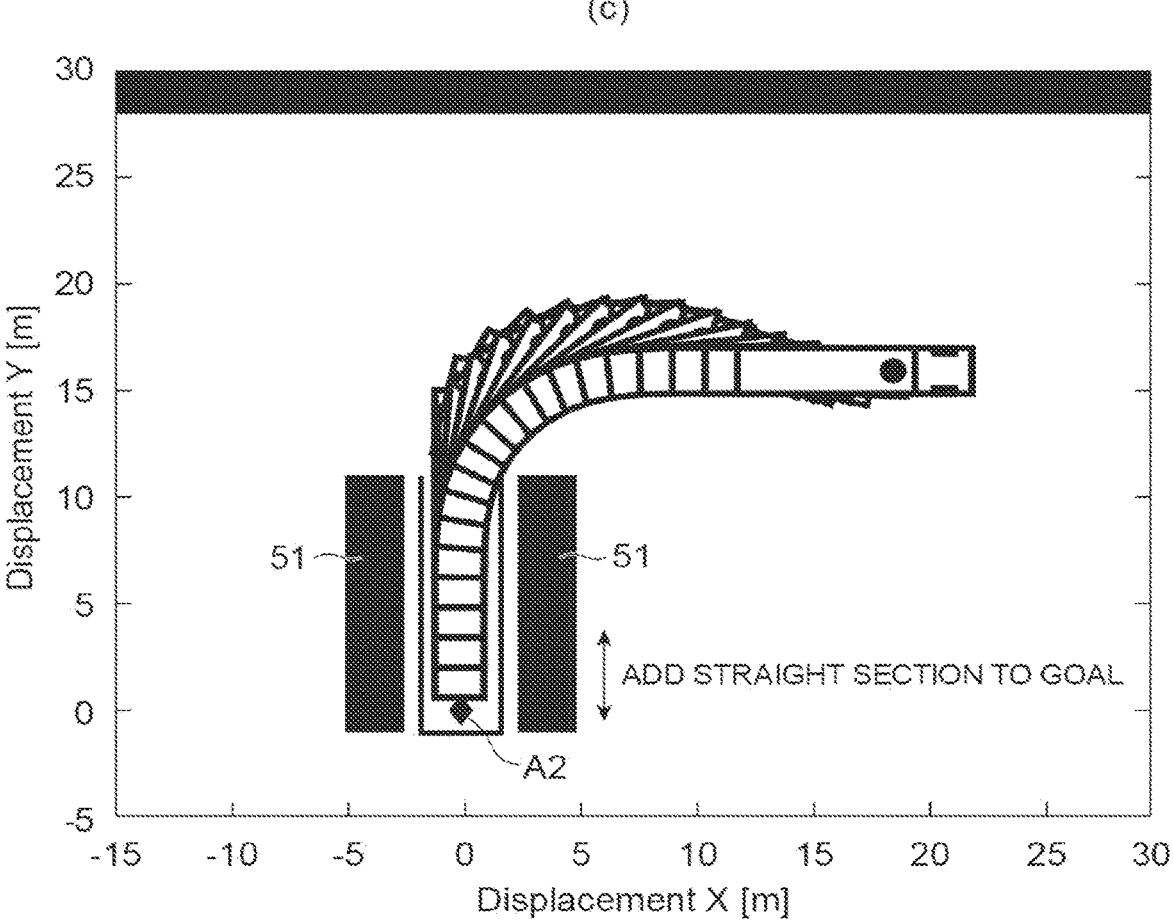

Subsequently, the route generation ECU 14 moves (adjusts) a position of each backward trajectory profile so that the backward trajectory profile fits within the virtual walls V1 to V3 constituting the virtual parking space (step S3). As illustrated in FIGS. 9(a) and 9(b), the backward trajectory profile is moved in a Y-axis (vertical) direction so that a position at which the coupled vehicle 2 does not collide with the virtual parking space is found. FIG. 9(a) is a diagram in which the backward trajectory profile has been greatly moved in a negative direction of a Y-axis, and FIG. 9(b) is a diagram in which the backward trajectory profile has been greatly moved in a positive direction of the Y-axis. The route generation ECU 14 uses, for example, a binary search method to set the backward trajectory profile at a position at which the coupled vehicle 2 does not collide with the virtual parking space and which is as close to the target parking position A2 as possible. As illustrated in FIG. 9(c), once the position of the backward trajectory profile is determined, the route generation ECU 14 modifies the trajectory to add a straight section to a goal (the target parking position A2).

Figure 10:
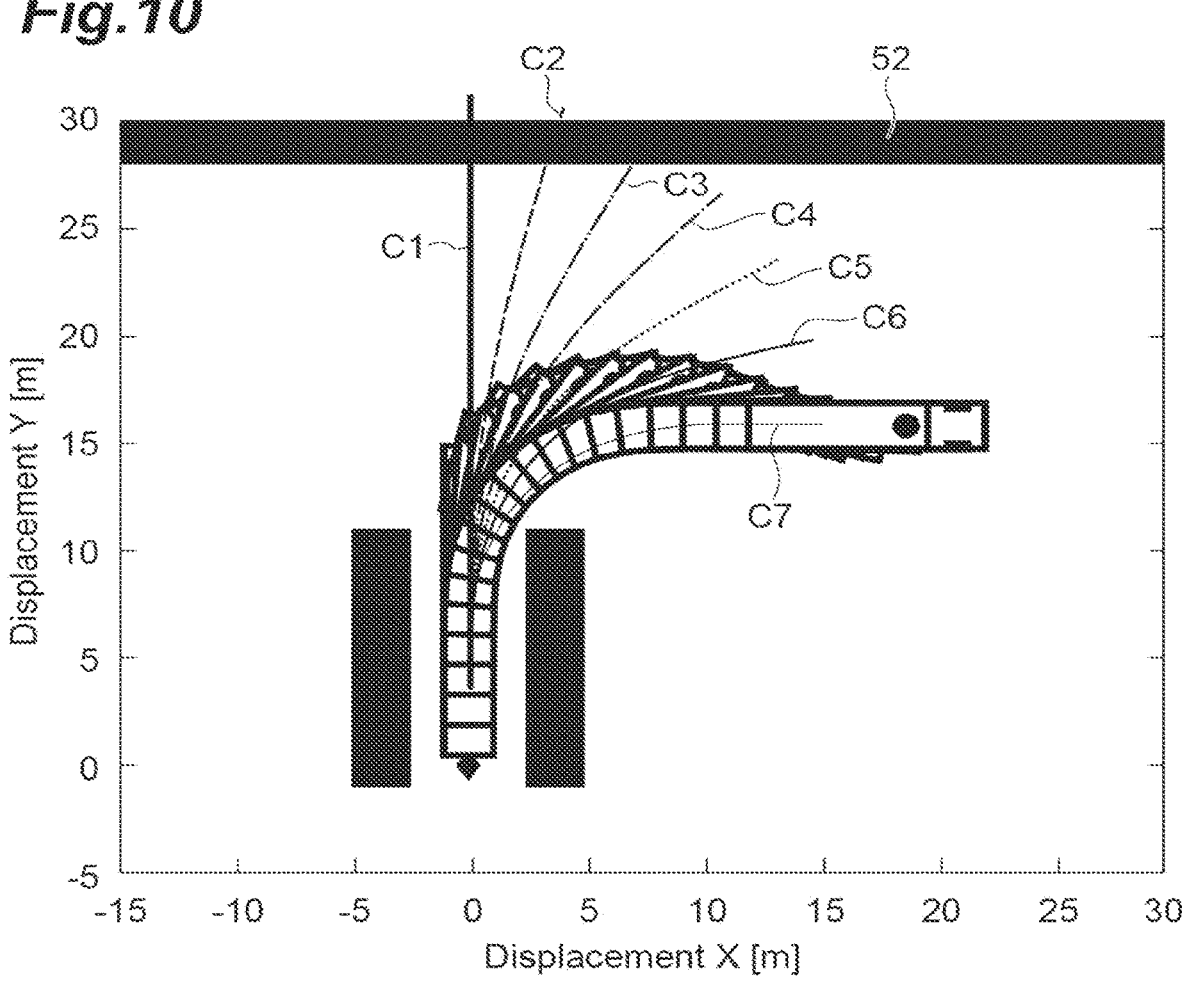
FIG. 10 is a diagram illustrating a collision determination using an obstacle map.

Subsequently, the route generation ECU 14 performs a collision determination related to the backward route of the coupled vehicle 2 on the basis of the obstacle map (step S4). The obstacle map is information indicating the position of the obstacle 50 acquired from the camera 13 which can function as the environment detection unit and the map storage unit 18 of the car navigation 11. The route generation ECU 14 determines whether the vehicle collides with an obstacle 50 (whether the obstacle 50 exists on the trajectory) for the plurality of backward trajectory profiles (tractor backward trajectories) leading to the target parking position A2. In an example illustrated in FIG. 10, backward trajectory profiles C1 to C3 among seven backward trajectory profiles C1 to C7 collide with the wall 52 of the building, which is the obstacle 50. In this case, the route generation ECU 14 leaves (selects) the backward trajectory profiles C4 to C7 other than the backward trajectory profiles C1 to C3 as candidate routes for the backward route.

Subsequently, the route generation ECU 14 determines the turnaround position A3 (backward movement start position) at which the coupled vehicle 2 starts backward movement, on the basis of the target parking position A2 and the backward trajectory profile selected by the trajectory selection unit 24. The route generation ECU 14 generates a forward route of a tractor trajectory on the basis of the parking start position A1 and the turnaround position A3 (step S5).

Figure 11:
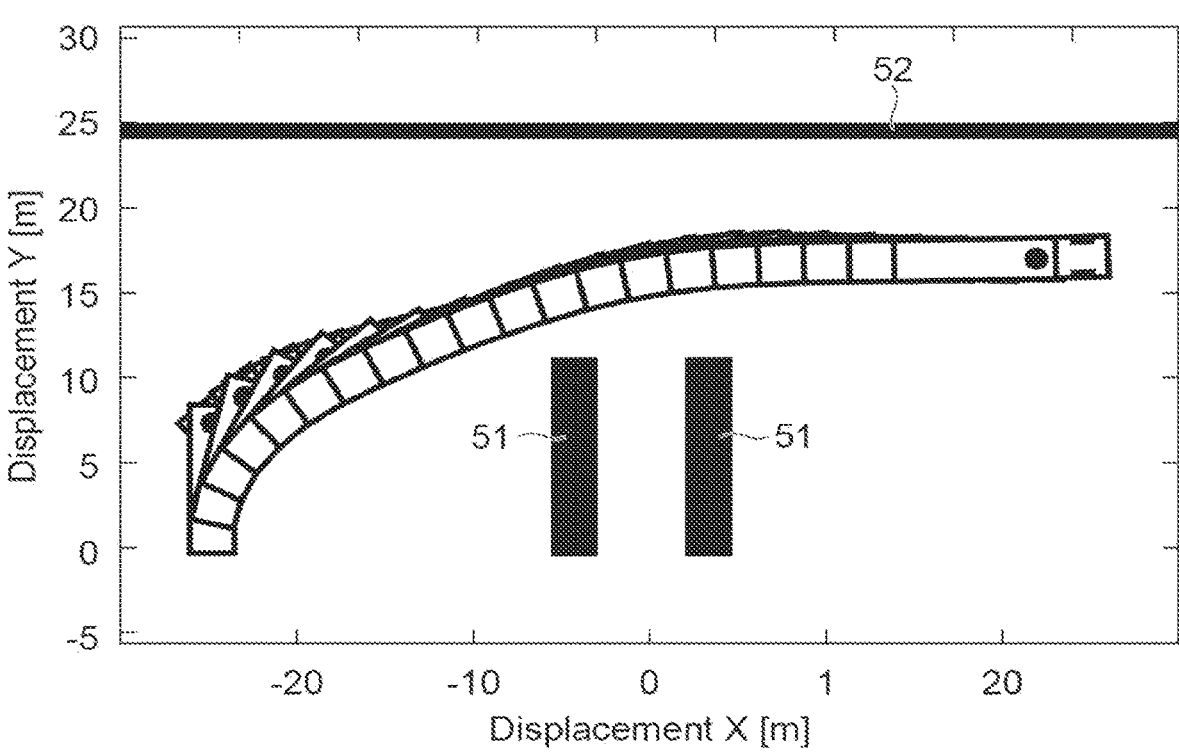
FIG. 11 is a diagram illustrating a collision determination using an obstacle map.

Subsequently, the route generation ECU 14 performs a collision determination related to the forward route of the coupled vehicle 2 on the basis of the obstacle map (step S6). The obstacle map is information indicating the position of the obstacle 50 acquired from the camera 13 which can function as the environment detection unit and the map storage unit 18 of the car navigation 11. The route generation ECU 14 determines whether a plurality of forward trajectory profiles (tractor forward trajectories) from the parking start position A1 to the turnaround position A3 collide with the obstacle 50 (whether the obstacle 50 is present on the trajectory). In the example illustrated in FIG. 11, the forward trajectory profile does not collide with, for example, the wall 52 of the building, which is the obstacle 50. Thus, the route generation ECU 14 specifies candidate routes for the forward route.

Figure 12:
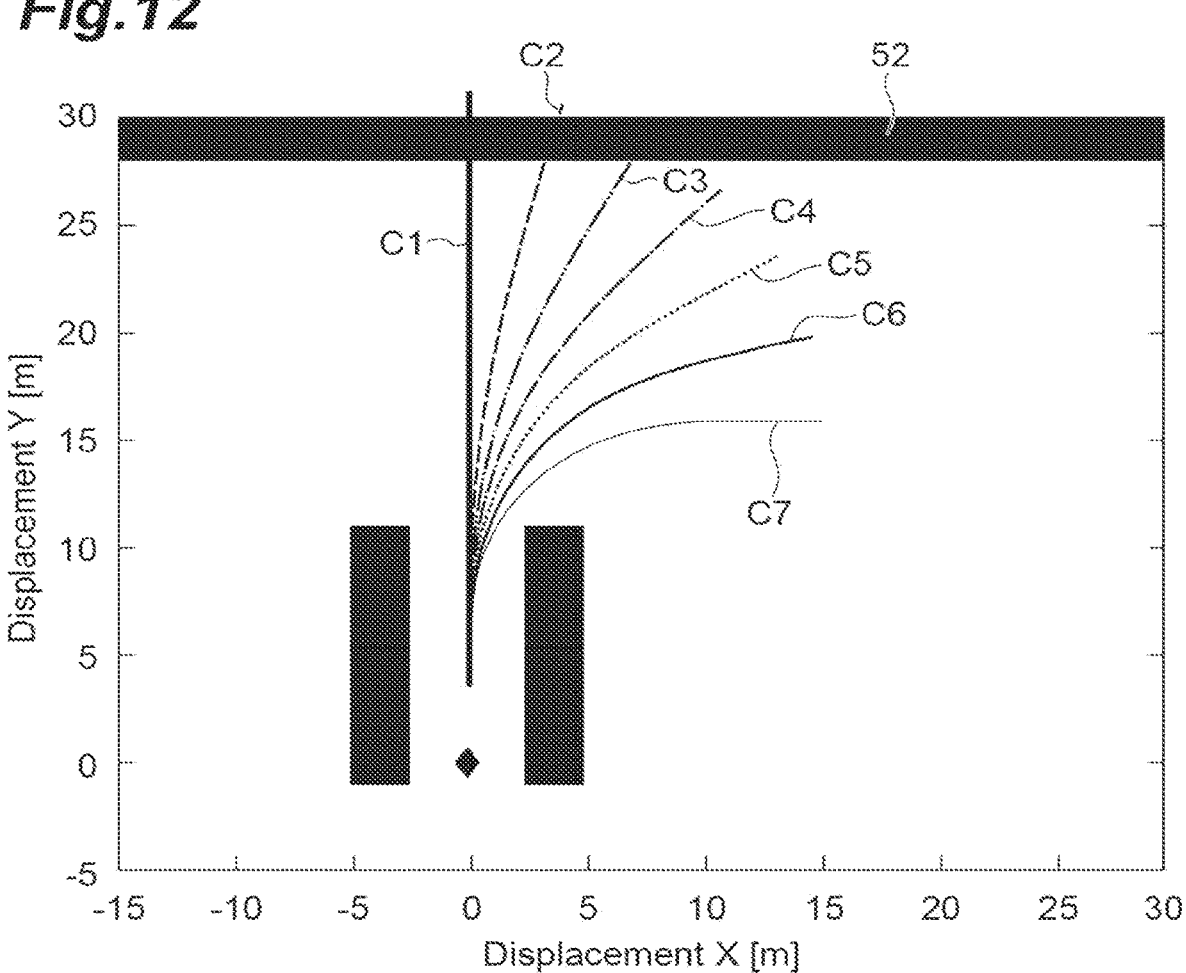
FIG. 12 is a diagram illustrating backward route selection based on a priority.

When there are a plurality of candidate routes, the route generation ECU 14 determines one final route from the candidate routes on the basis of a preset priority. In the example illustrated in FIG. 12, the backward trajectory profiles C4 to C7 are selected as candidate routes for the backward route. In this case, the route generation ECU 14 determines, for example, the backward trajectory profile C4 having the lowest degree of change in curvature in the route among the plurality of backward trajectory profiles C4 to C7, as a final route of the backward route. The forward route is also determined to be a forward route that is continuous with the backward trajectory profile C4.

Finally, the route generation ECU 14 uses the geometric model of the coupled vehicle 2 to perform a vehicle motion simulation in which the coupled vehicle 2 performs follow-up control through forward traveling from the parking start position A1 and the target parking position A2 to the turnaround position A3, to thereby calculate a data series of the steering angle of the tractor 3 and a data series of each posture angle of the tractor 3 and the trailer 4. The data series is history data.

Next, effects of the parking route generation device 16 according to the present embodiment will be described.

The parking route generation device 16 according to the present embodiment is a parking route generation device that generates a parking route for causing the coupled vehicle 2 including the tractor 3 and the trailer 4 to park, and includes the pattern storage unit 21 that stores the plurality of backward route patterns with the rear axle of the trailer 4 as a reference for each wheelbase length of the trailer 4, the plurality of backward route patterns being a plurality of backward route patterns having a different degree of change in curvature in the route; the position setting unit 22 that sets the parking start position A1 of the coupled vehicle 2 and the target parking position A2 of the coupled vehicle 2 on the basis of the information including the current position of the coupled vehicle 2; the trajectory generation unit 23 that specifies the plurality of backward route patterns corresponding to the wheelbase length of the trailer 4 in the coupled vehicle 2 on the basis of the information indicating the wheelbase length of the trailer 4 in the coupled vehicle 2 and the information stored in the pattern storage unit 21, and generates a plurality of backward route profiles on the basis of the plurality of specified backward route patterns; the trajectory selection unit 24 that selects the backward trajectory profile in which the coupled vehicle 2 does not collide with the obstacle 50 on the basis of the target parking position A2, the information on the obstacle 50 around the coupled vehicle 2, and the plurality of backward trajectory profiles; the route determination unit 25 that determines the parking route so that the coupled vehicle 2 that has started parking from the parking start position A1 is parked at the target parking position A2 through backward movement after forward movement, on the basis of the parking start position A1, the target parking position A2, and the backward trajectory profile selected by the trajectory selection unit 24; and the route output unit 26 that outputs the parking route determined by the route determination unit 25.

In the parking route generation device 16 according to the present embodiment, the plurality of backward route patterns with the rear axle of the trailer 4 as a reference are stored for each wheelbase length of the trailer 4 in advance. When the parking route is generated, the plurality of backward trajectory profiles corresponding to the wheelbase length of the trailer 4 in the coupled vehicle 2 are specified, and the plurality of backward trajectory profiles are generated on the basis of the plurality of specified backward trajectory profiles. The backward trajectory profile in which the coupled vehicle 2 does not collide with the surrounding obstacle 50 is selected from among the plurality of backward trajectory profiles generated in this way, and the parking route is determined on the basis of the selected backward trajectory profile, the parking start position A1, and the target parking position A2. In the parking route for the coupled vehicle 2, a movement is complex particularly at the time of backward movement. Therefore, there is a problem in that it is difficult to generate the backward route with high precision in generation of the parking route for the coupled vehicle 2, and a calculation cost increases in order to generate the backward route with as high precision as possible. In this regard, in the parking route generation device 16 according to the present embodiment, since the plurality of backward route patterns are stored for each wheelbase length of the trailer 4 in advance, and the backward route profile is selected from among such information stored in advance, it is possible to greatly reduce the calculation cost. Further, since the plurality of backward route patterns are stored for each wheelbase length of the trailer 4, it is possible to generate the backward route with high precision (with high reproducibility) depending on the type of trailer 4 to be coupled to the tractor. As described above, with the parking route generation device 16 according to the present embodiment, it is possible to generate the parking route for the coupled vehicle 2 with high accuracy and at low calculation cost.

Figure 13:
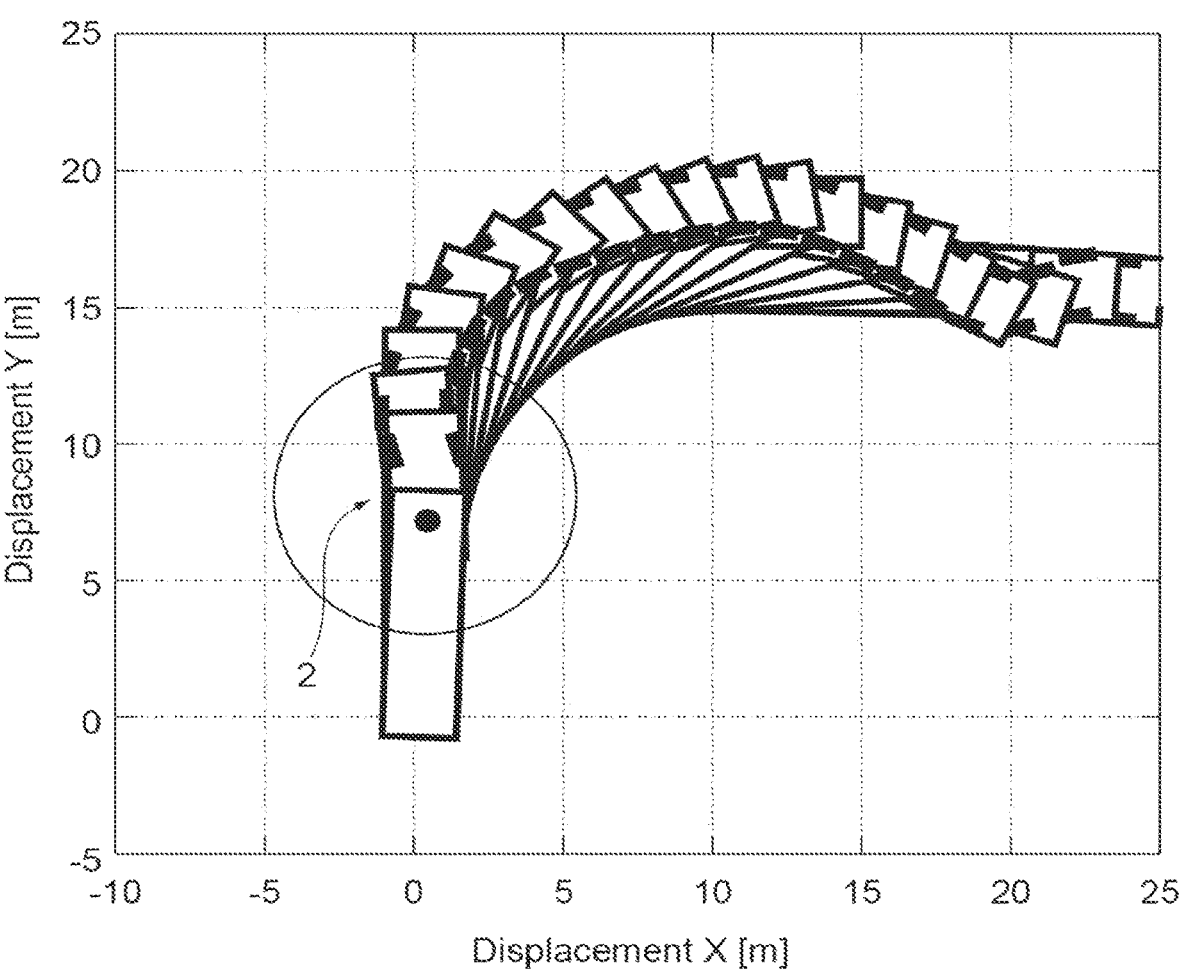
FIG. 13 is a diagram illustrating parking route generation according to a comparative example.

The route determination unit 25 may determine the turnaround position A3, which is a backward movement start position at which the coupled vehicle 2 starts the backward movement, on the basis of the target parking position A2 and the backward trajectory profile selected by the trajectory selection unit 24, determine, as the backward route, a route to reach the target parking position A2 along the selected backward trajectory profile from the turnaround position A3, determine a forward route in which the coupled vehicle 2 that has started forward movement from the parking start position A1 reaches the turnaround position A3 without collision with the obstacle 50, on the basis of the parking start position A1, the turnaround position A3, and the information on the obstacle 50, after determining the backward route, and determine the parking route on the basis of the forward route and the backward route. For example, when the forward route is determined first and then the backward route is determined in an order of actual traveling routes, there may be restrictions regarding the forward route in determining the backward route and, for example, the vehicle posture may be bent at a point in time when the target parking position is reached. FIG. 13 is a diagram illustrating parking route generation according to a comparative example. In the example illustrated in FIG. 13, the forward route is determined first, and then the backward route is determined, and a vehicle posture of the coupled vehicle 2 is bent at a point in time when the coupled vehicle 2 has reached the target parking position. Such a problem occurs more noticeably in the coupled vehicle 2 having a coupling angle. In this respect, since the backward route is determined first and then the forward route is determined (the route determination is made in reverse order from the target parking position A2), there are no restrictions regarding the forward route when the backward route is determined, making it possible to generate an ideal parking route by curbing bending of the vehicle posture at the time of parking.

When there are a plurality of backward trajectory profiles in which the coupled vehicle 2 does not collide with the obstacle 50, the route determination unit 25 may determine the parking route on the basis of one backward trajectory profile having the lowest degree of change in curvature in the route among the plurality of backward trajectory profiles in which the coupled vehicle 2 does not collide with the obstacle 50. Accordingly, since a route in which the number of steering wheel operations is as small as possible is selected for the backward route, it is possible to curb driver's discomfort at the time of backward movement.

The embodiments of the present invention have been described above, but the present invention is not limited to the above embodiments. For example, in the above embodiment, the current position of the coupled vehicle 2 is measured by the GPS receiver 17 of the car navigation 11, but the position detection unit that detects the current position of the coupled vehicle 2 is not limited to the GPS receiver 17. For example, the current position of the coupled vehicle 2 may be estimated by using a laser SLAM scheme in which data from a laser sensor that irradiates an area around the coupled vehicle 2 with a laser and receives reflected light of the laser has been used, or the current position of the coupled vehicle 2 may be estimated by using a visual SLAM scheme in which a captured image of a camera has been used. Further, in the above embodiment, the obstacle 50 present around the coupled vehicle 2 is detected by using the camera 13, but the present invention is not limited to this form, and the obstacle 50 present around the coupled vehicle 2 may be detected by using a laser sensor, a radar sensor, or the like instead of the camera 13 or together with the camera 13.

Further, the target route of the trailer 4 is generated by using a tri-clothoid curve in the above embodiment, but the present invention is not limited to this form, and a curve on which the curvature between the initial position and the target position of the trailer 4 changes continuously may be used. Examples of such a curve include a Biarc curve, a Clothoid curve, a Bezier curve, and a Spline curve.

Further, although the coupled vehicle 2 is a semi-trailer type truck in the embodiment, the present invention is also applicable to a full trailer type truck. Further, the present invention is not particularly limited to trucks, but can also be applied to coupled vehicles such as buses.

Further, the parking route generation device 16 of the embodiment is included in a travel control device that moves the coupled vehicle 2 backward through automatic driving, the present invention is not particularly limited to this form and can also be applied to a case in which backward parking of the coupled vehicle 2 is performed through manual driving by using a parking assistance system.

Further, the parking route generation device 16 of the embodiment is applied to a parking assistance system that assists in the backward parking of the coupled vehicle 2, but the present invention is not particularly limited to the backward parking of the coupled vehicle 2, and can also be applied to, for example, forward traveling, such as turning left or right at an intersection.

REFERENCE SIGNS LIST

2 Coupled vehicle
3 Tractor
4 Trailer
16 Parking route generation device
21 Pattern storage unit
22 Position setting unit
23 Trajectory generation unit
24 Trajectory selection unit
25 Route determination unit
26 Route output unit
50 Obstacle
A1 Parking start position
A2 Parking target position
A3 Turnaround position (backward movement start position)

The invention claimed is:

1. A parking route generation device for generating a parking route for causing a coupled vehicle including a tractor and a trailer to park, the parking route generation device comprising:

a pattern storage unit configured to store a plurality of backward route patterns with a rear axle of the trailer as a reference for each wheelbase type of the trailer, the plurality of backward route patterns having different degrees of change in curvature in the route;

a position setting unit configured to set a parking start position of the coupled vehicle and a target parking position of the coupled vehicle on the basis of information including a current position of the coupled vehicle;

a trajectory generation unit configured to specify the plurality of backward route patterns corresponding to a wheelbase type of the trailer in the coupled vehicle on the basis of information indicating the wheelbase type of the trailer in the coupled vehicle and information stored in the pattern storage unit, and generate a plurality of backward trajectory profiles on the basis of the plurality of specified backward route patterns;

a trajectory selection unit configured to select the backward trajectory profile in which the coupled vehicle does not collide with an obstacle on the basis of the target parking position, information on the obstacle near the coupled vehicle, and the plurality of backward trajectory profiles;

a route determination unit configured to determine the parking route so that the coupled vehicle that has started parking from the parking start position is parked at the target parking position through backward movement after forward movement, on the basis of the parking start position, the target parking position, and the backward trajectory profile selected by the trajectory selection unit;

a route output unit configured to output the parking route determined by the route determination unit; and a follow-up control unit configured to perform steering control and speed control of the coupled vehicle to park the coupled vehicle at the target parking position according to the parking route.

2. The parking route generation device according to claim 1, wherein the route determination unit determines a backward movement start position at which the coupled vehicle starts the backward movement, on the basis of the target parking position and the backward trajectory profile selected by the trajectory selection unit, determines, as a backward route, a route to reach the target parking position along the selected backward trajectory profile from the backward movement start position, determines a forward route in which the coupled vehicle that has started forward movement from the parking start position reaches the backward movement start position without collision with the obstacle, on the basis of the parking start position, the backward movement start position, and the information on the obstacle, after determining the backward route, and determines the parking route on the basis of the forward route and the backward route.

3. The parking route generation device according to claim 1, wherein, when there are a plurality of backward trajectory profiles in which the coupled vehicle does not collide with the obstacle, the route determination unit determines the parking route on the basis of one backward trajectory profile having a lowest degree of change in curvature in the route among the plurality of backward trajectory profiles in which the coupled vehicle does not collide with the obstacle.

4. A parking route generation device for generating a parking route for causing a coupled vehicle including a tractor and a trailer to park, the parking route generation device comprising:

a memory to store a plurality of backward route patterns with a rear axle of the trailer as a reference for each wheelbase type of the trailer, the plurality of backward route patterns having different degrees of change in curvature in the route;

an electronic control unit configured to set a parking start position of the coupled vehicle and a target parking position of the coupled vehicle on the basis of information including a current position of the coupled vehicle;

specify the plurality of backward route patterns corresponding to a wheelbase type of the trailer in the coupled vehicle on the basis of information indicating the wheelbase type of the trailer in the coupled vehicle and information stored in the memory, and generate a plurality of backward trajectory profiles on the basis of the plurality of specified backward route patterns;

select the backward trajectory profile in which the coupled vehicle does not collide with an obstacle on the basis of the target parking position, information on the obstacle near the coupled vehicle, and the plurality of backward trajectory profiles;

determine the parking route so that the coupled vehicle that has started parking from the parking start position is parked at the target parking position through backward movement after forward movement, on the basis of the parking start position, the target parking position, and the backward trajectory profile;

output the parking route; and perform steering control and speed control of the coupled vehicle to park the coupled vehicle at the target parking position according to the parking route.

5. The parking route generation device according to claim 4, wherein the electronic control unit determines a backward movement start position at which the coupled vehicle starts the backward movement, on the basis of the target parking position and the backward trajectory profile, determines, as a backward route, a route to reach the target parking position along the selected backward trajectory profile from the backward movement start position, determines a forward route in which the coupled vehicle that has started forward movement from the parking start position reaches the backward movement start position without collision with the obstacle, on the basis of the parking start position, the backward movement start position, and the information on the obstacle, after determining the backward route, and determines the parking route on the basis of the forward route and the backward route.

6. The parking route generation device according to claim 4, wherein, when there are a plurality of backward trajectory profiles in which the coupled vehicle does not collide with the obstacle, the electronic control unit determines the parking route on the basis of one backward trajectory profile having a lowest degree of change in curvature in the route among the plurality of backward trajectory profiles in which the coupled vehicle does not collide with the obstacle.

* * * * *